(12) United States Patent
Bogenberger et al.

(10) Patent No.: US 8,429,321 B2
(45) Date of Patent: Apr. 23, 2013

(54) REQUEST CONTROLLER, PROCESSING UNIT, METHOD FOR CONTROLLING REQUESTS AND COMPUTER PROGRAM PRODUCT

(75) Inventors: Florian Bogenberger, Poing (DE); Vladimir A. Litovtchenko, Munich (DE)

(73) Assignee: Freescale Semiconductor, Inc., Austin, TX (US)

( * ) Notice: Subject to any disclaimer, the term of this patent is extended or adjusted under 35 U.S.C. 154(b) by 927 days.

(21) Appl. No.: 12/526,306

(22) PCT Filed: Feb. 8, 2007

(86) PCT No.: PCT/IB2007/050420
§ 371 (c)(1),
(2), (4) Date: Aug. 7, 2009

(87) PCT Pub. No.: WO2008/096208
PCT Pub. Date: Aug. 14, 2008

(65) Prior Publication Data
US 2010/0011142 A1    Jan. 14, 2010

(51) Int. Cl.
*G06F 13/24*    (2006.01)
(52) U.S. Cl.
USPC .......................................... 710/260; 709/230
(58) Field of Classification Search .................. 710/260, 710/262–264, 267, 48; 709/230–233
See application file for complete search history.

(56) References Cited

U.S. PATENT DOCUMENTS

| | | | |
|---|---|---|---|
| 4,819,173 | A | 4/1989 | Brauninger |
| 4,930,068 | A | 5/1990 | Katayose et al. |
| 5,392,435 | A | 2/1995 | Masui et al. |
| 5,423,049 | A | 6/1995 | Kurihara |

(Continued)

FOREIGN PATENT DOCUMENTS

| | | |
|---|---|---|
| DE | 10160298 A1 | 6/2003 |
| EP | 0497628 B1 | 1/1992 |
| WO | 0052586 | 9/2000 |

OTHER PUBLICATIONS

Definition of Multiplexer, Wikipedia <http://en.wikipedia.org/wiki/Multiplexer> accessed on Jul. 12, 2010, 7 pages.

(Continued)

*Primary Examiner* — Clifford Knoll

(57) ABSTRACT

A request controller for controlling processing of requests by one or more semiconductor data processing unit. The resource controller includes a controller input for receiving a request for the processing unit to switch a context of the processing unit or to switch the processing unit from a current an operation to another operation. The resource controller includes a resource budget memory in which one or more budget value can be stored. The budget value represents an amount of a resource of the processing unit. The resource controller further has a budget controller which includes a first budget controller input connected to the request controller input. A second budget controller input is connected to the memory. A comparator is connected to the first budget controller input and the second controller input, for comparing a consumption value associated with the request with the budget value. The comparator includes a comparator output for outputting a request grant signal when the comparison satisfies a predetermined grant criterion and outputting a request reject value when the comparison meets a predetermined reject criterion. A data controller is connected to the resource budget memory and the comparator output, for adjusting the budget value when the request grant signal is outputted.

20 Claims, 2 Drawing Sheets

U.S. PATENT DOCUMENTS

| | | |
|---|---|---|
| 5,535,397 A | 7/1996 | Durante et al. |
| 5,542,076 A | 7/1996 | Benson et al. |
| 5,805,883 A | 9/1998 | Saitoh |
| 5,805,902 A | 9/1998 | Kikinis et al. |
| 5,931,936 A | 8/1999 | Chung et al. |
| 6,065,089 A | 5/2000 | Hickerson et al. |
| 6,185,639 B1 | 2/2001 | Kailash et al. |
| 6,216,182 B1 | 4/2001 | Nguyen et al. |
| 6,889,277 B2 | 5/2005 | Musumeci |
| 7,124,225 B2 | 6/2006 | Bosch |
| 7,099,977 B2 | 8/2006 | Chong et al. |
| 2002/0161961 A1 | 10/2002 | Hardin et al. |
| 2003/0056047 A1 | 3/2003 | Connor et al. |
| 2003/0200368 A1 | 10/2003 | Musumeci |
| 2005/0102458 A1 | 5/2005 | Ober et al. |
| 2005/0177668 A1 | 8/2005 | Kimelman et al. |
| 2005/0182879 A1 | 8/2005 | Vu |
| 2005/0246465 A1 | 11/2005 | Wright et al. |
| 2006/0211415 A1 | 9/2006 | Cassett et al. |
| 2008/0140895 A1 | 6/2008 | Baker et al. |
| 2010/0030939 A1 | 2/2010 | Litovtchenko et al. |

OTHER PUBLICATIONS

International Search Report and Written Opinion correlating to PCT/IB2007/050511, dated Oct. 19, 2007.

Intersil, "82C59A Priority Interrupt Controller", Application Note, Apr. 1999, 14 pages.

Non-Final Office Action mailed Mar. 6, 2012, for U.S. Appl. No. 12/527,372, 12 pages.

International Search Report and Written Opinion correlating to PCT/IB2007/050420 dated Jun. 29, 2007.

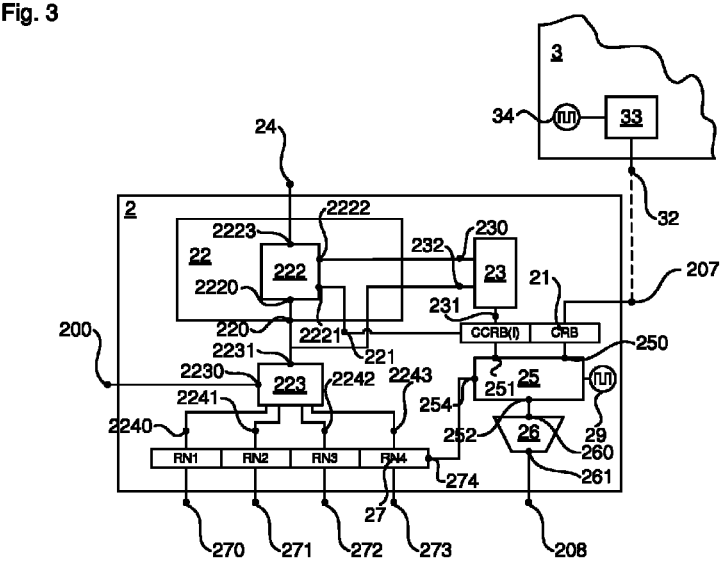

REQUEST CONTROLLER, PROCESSING UNIT, METHOD FOR CONTROLLING REQUESTS AND COMPUTER PROGRAM PRODUCT

FIELD OF THE INVENTION

This invention relates to a request controller, to a processing unit, to a method for controlling requests and to a computer program product.

BACKGROUND OF THE INVENTION

Data processing system are known in which, when in operation, a processing unit performs a certain task. The task may, for example, be the execution of a series of instructions defined by, for example, a computer program. Other devices or computer programs can have the processing unit perform requested services by generating interrupt requests. An interrupt request may for example be transmitted by a peripheral device to the processing unit. The interrupt request may for example be sent by an external memory device, such as a hard-disk, to signal the completion of task, such as a data transfer from or to the peripheral. Also, the interrupt request may for example be used to transmit information to the processing unit. For instance, a system timer may periodically transmit interrupt requests which can be used by the processing unit to establish a time-base.

The interrupt requests are propagated to an interrupt controller via multiple interrupt request lines. Once the interrupt controller identifies an active interrupt request line, it may grant the interrupt request and forward the interrupt request to the processing unit. In response to the interrupt request, the processing unit will interrupt the task being performed and perform a sequence of steps, generally referred to as an interrupt handler or interrupt service routine, associated with the requested interrupt.

However, a disadvantage of the use of interrupts is that the processing unit may be overloaded with the interrupt service routines.

European Patent EP 497 628 discloses a solution to avoid a central processing unit (CPU) in a multi processor circuit from being overloaded. This prior art document discloses a multi-processor circuit with a plurality of CPUs and an interrupt line for inputting interruption signals. The circuit further includes an interrupt restriction circuit connected between the interrupt line and each of the CPUs. The interrupt restriction circuit disables the input of the interruption signals to a CPU when the respective CPU has received a number of interruption signals in a specified time which exceeds a fixed number. However, a disadvantage thereof is that still a risk exists that the CPU is overloaded with requests, for instance in case a number of interrupt signals is received which is below the fixed number, but for each of which interrupt request the processing requires a large amount of CPU resources.

U.S. Pat. No. 6,889,277 discloses a system in which the period between successive interrupt requests is dynamically adjusted depending on a workload of a communication interface. However, a disadvantage thereof is that the CPU may be overloaded with requests.

United States Patent Application Publication US 2005/0177668 discloses a data processing system nested interrupt controller. The interrupt controller is responsive to priority level values associated with the respective interrupt handling programs to control the execution of the interrupt handlers. However, a disadvantage thereof is that overloading of the processing unit with interrupts is not prevented. For instance, the processing unit may receive a number of high priority interrupt requests which number exceeds the processing capacity of the processing unit.

SUMMARY OF THE INVENTION

The present invention provides a request controller, a processing unit, a data processing apparatus, a method for controlling requests, and a computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

FIG. 3 schematically shows a block diagram of a second example of an embodiment of an interrupt controller.

FIG. 4 shows a schematic top-view of an example of a vehicle provided with an example of a processor.

DETAILED DESCRIPTION OF THE PREFERRED EMBODIMENTS

In the following, by way of example only, as an embodiment of a request controller is described which is implemented as an interrupt controller. However, it will be apparent that the request controller may be implemented to control other types of requests. For example, the request may be a request to switch a context of a processing unit or to switch a processing unit from a current operation to another operation. The request controller may for example control interrupt requests and/or context switch requests and/or task switch requests and/or thread switch requests and/or process switch requests and/or other suitable types of requests. Accordingly, although in the description of the example below, the terms 'interrupt' or 'interrupt request' are used, these may be replaced by the more general term 'request', or depending on the specific implementation, by one of more of the terms: context switch request, task switch request, thread switch request, process switch request.

Figure 1:
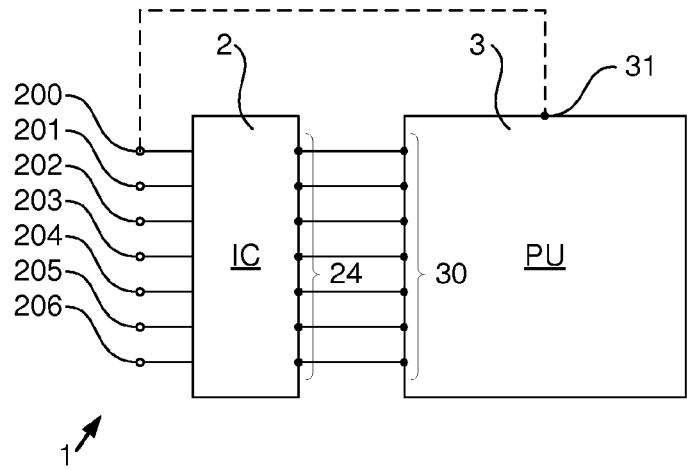
FIG. 1 schematically shows a block diagram of an example of an embodiment of a processor assembly.

Referring to FIG. 1, an example of an embodiment of a processor assembly 1 is schematically shown therein. The processor assembly 1 may, as shown in FIG. 1, include an interrupt controller (IC) 2 and a processing unit (PU) 3. Although in FIG. 1 only one IC 2 and one processing units 3 are shown, the processor assembly 1 may include two or more ICs 2 and/or two or more processing units 3. For example the processor assembly 1 may include a plurality of processing units 3 connected to the same IC 2 or include a plurality of processing units 3 connected to the different ICs 2.

The interrupt controller 2 may be connected to the processing unit 3. In the example of FIG. 1, for instance, one or more controller outputs 24 may be connected to one or more interrupt inputs 30 of the processing unit 3. (In FIGS. 1 and 2, for illustrative purposes, several separate controller outputs 24 and interrupt inputs 30 are shown, each serving for a separate type of interrupt request, however it will be appreciated that more or less interrupt inputs 30 and controller outputs 24 may be present and/or different types of interrupt requests may be outputted at the same controller output 24 and/or inputted to the same interrupt inputs 30.)

The interrupt controller 2 may include one or more interrupt controller inputs 200-206 (in the example of FIG. 1 seven are shown, however the IC 2 may include more or less inputs). As is indicated with the dashed line in FIG. 1, an interrupt request output 31 of the processing unit 3 may be connected to an interrupt controller input 200. The interrupt controller 2 may receive one or more interrupt requests $IR_1 \ldots IR_N$ of one or more types 1 ... N. For example, at each of the interrupt controller inputs 200, 201, . . . a respective type of interrupt request $IR_1$, $IR_2$, . . . may be received.

The interrupt requests $IR_1 \ldots IR_N$ may for example be sent by other devices connected to the interrupt controller inputs 200-206. An interrupt request $IR_i$ of a type i may for example sent by another device (not shown in FIG. 1) in order to transmit or receive data from or to the processing unit 3. The interrupt request may also be sent by the processing unit 3 and may, for example, be generated by the processing unit 3 when executing instructions of a computer program.

The interrupt request may for example be sent, via the interrupt request output 31, by the processing unit 3 to the controller input 200 in response to an interrupt command included in the computer program.

In response to an interrupt request $IR_i$, the processing unit 3 may for example store the computer program and the data being processed by the processing unit 3 in a memory. The processing unit 3 may also execute a sequence of steps, known as an interrupt handler (IH), to service the interrupting device. For example, the processing unit 3 may process received data in response to an interrupt request IR or perform a certain calculation in response to the interrupt request IR. After the interrupt handler IH has been executed, the processing unit 3 may retrieve the computer program and data stored in the memory and resume the task which was being performed at the point in time the interrupt request $IR_i$ was received.

The interrupt controller 2 may control the interrupt requests IR received on interrupt controller inputs 200-206. The interrupt controller 2 may for example receive the interrupt requests IR and decide to grant or deny an interrupt request IR based on a comparison of the request with one or more predetermined criteria. The interrupt controller 2 may, for example, forward an interrupt request to the respective processing unit 3 when the interrupt request IR is granted or inhibit the transfer of the interrupt request to the processing unit 3 when the request is denied, for example, by discarding the interrupt request.

Figure 2:
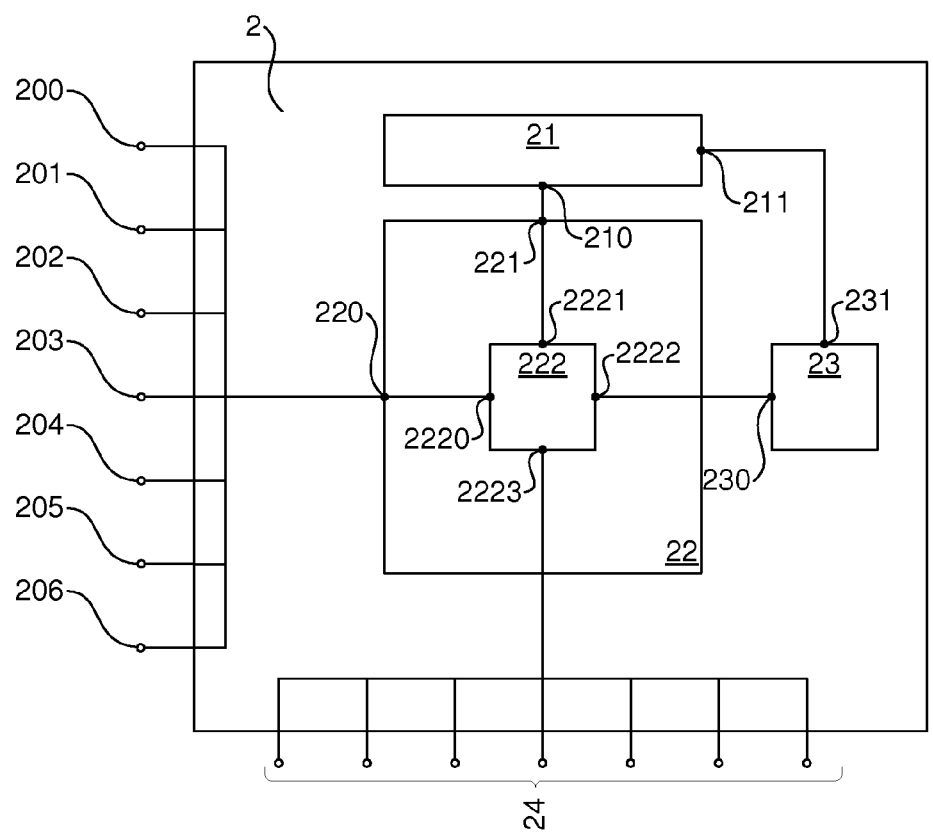
FIG. 2 schematically shows a block diagram of a first example of an embodiment of an interrupt controller.

As shown in FIG. 2 in more detail, the interrupt controller 2 may for example include one or more interrupt controller inputs 200-206, a budget memory 21, a budget controller 22, and a data controller 23

In the budget memory 21, from hereon referred to as the interrupt budget memory 21, a budget value may be stored. The budget value may represent an amount of a resource of the processing unit 3. The budget value may represent any countable resource. The budget value may for example represent an amount of memory available to handle interrupts in a certain period of time, an amount of data the processing unit 3 may process to handle interrupts during a certain period of time, or a proportion of the time available for handling interrupts during a certain period of time. The budged value may for example represent an amount of a resource of a single processor or the total amount of a resources of type for a plurality of processors.

The budget value may be any suitable value. The budget value may for example be a budget value $CCRB_i$ for a specific type of interrupt requests $IR_i$ or an overall budget value CRB. The request type specific budget value $CCRB_i$ may for example represent the amount of a type of resource(s) of the processing unit(s) available for a type of interrupt requests $IR_i$. The overall budget value CRB may for example represent the amount of a type of resources of the processing unit(s) 3 available for all the request types $IR_1 \ldots IR_N$ The budget value may for example represent an amount of resources available during a period of time and be set, for example, by the processor 3 depending on the requirements imposed by the specific application in which the processor 3 is to be used. For instance, it may have been predetermined that a specific sequence of interrupts requires an amount X of resources of the processing unit 3 during a period of time T in order to be handled. The budget value $CCRB_i$ or CRB may then be set to a value proportional to the amount X.

The budget controller 22 may control the processing of the interrupt requests $IR_1 \ldots IR_N$ based on the stored budget value and on a consumption value $RN_i$ associated with the specific type of interrupt requests $IR_i$. As shown in FIG. 2, the budget controller 22 may for example include a first budget controller input 220, a second budget controller input 221 and a comparator 222. The first budget controller input 220 may be connected to one or more of the interrupt controller inputs 200-206. The second budget controller input 221 may be connected to the interrupt budget memory 21, for example, to a memory input 210 of the interrupt budget memory 21. The comparator 222 may be connected to the first budget controller input 220 and to the second controller input 221. As shown in the examples of FIG. 2, the comparator 222 may for instance include a first comparator input 2220 which is connected to the first budget controller input 220, a second comparator input 2221 which is connected to the memory 21. The comparator 222 further has a comparator output 2222 which is connected to the data controller 23 and another comparator output 2223 which is connected to an interrupt controller output 24.

The data controller 23 may control the budget value stored in the memory and may be connected to the interrupt budget memory 21 and to the comparator output 2222. As shown in FIG. 2, the data controller 23 may for example include a controller output 231 which is connected to an output 211 of the memory 21. The memory controller 21 may include a controller input 230 which is connected to the comparator output 2222. Via the controller output 231, the data controller 23 may store budget values in the memory 21, and hence control the memory 21. Via the controller input 230, the data controller 23 may receive information about, for example, adjustments to be made to the budget value. For instance, the data controller 23 may receive information about the granted interrupt request and the consumption values $IR_i$ associated with the granted requests from the comparator 222.

The interrupt controller 2 may perform a method for controlling interrupts issued to the processing unit 3. The interrupt controller 2 may for example perform a method as follows. An interrupt request $IR_i$ may be received, for example, at a respective one of the interrupt controller inputs 200-206. The interrupt request $IR_i$ may be of a certain type i. The type i may be associated with a type specific consumption value $RN_i$. The consumption value $RN_i$ may for example represent an amount of a budget that will be needed to handle the interrupt request $IR_i$. As shown in FIG. 3, for instance, the interrupt controller 2 may include a memory 27 in which the consumption values $RN_i$ are stored. The consumption values $RN_i$ may for example be associated with the source of the interrupt request $IR_i$. For example, each source may use another one of the interrupt controller inputs 200-206 and in the consumption value memory 27 a table with the consumption values $RN_i$ associated with each interrupt controller input 200-206 may be stored.

The consumption value $RN_i$ may be compared with the budget value stored in the interrupt budget memory 21, for example, by the comparator 222. An interrupt grant signal may be outputted when the comparison satisfies a predetermined grant criterion. For instance, the comparator 222 may output an interrupt reject value when the comparison meets a predetermined reject criterion. The comparator 222 may for example output the respective interrupt signal at a comparator output 2222,2223, for instance to transmit the interrupt signal to the processing unit 3 and/or the data controller 23.

When the interrupt grant signal is outputted, the budget value may be adjusted. Thereby consumption, during the handling of the interrupts, of more resources, e.g. per period of time, than is allowed by the budget value may be prevented. Accordingly, the overload of the processing unit 3 may be prevented, by selecting a suitable initial budget value. Furthermore, in case one or more of the devices connected to the processing unit 3 (or a computer program executed by the processing unit 3) generates a fault which results in an undesired high frequency of interrupt requests, the budget value will be adjusted, until the comparison of the consumption value $RN_i$ with the budget value does not meet the predetermined criterion anymore. The interrupt requests will then be rejected and the processing unit 3 is no longer loaded by interrupt requests. Thus, overloading of the processing unit 3 may be prevented. Also, errors caused by or resulting in interrupt requests can be detected without additional load to the processing unit 3, by monitoring the budget value and/or the adjustments to the budget values. For instance, the data controller 23 may receive the interrupt grant signal at the controller input 230 and adjust the budget value stored in the memory by outputting a suitable signal to the memory 21 via the controller output 231 and the memory input 211.

The (interrupt) request may be of a type suitable for the specific implementation, and for example be of a type that is sent periodically and/or in a predictable manner. Also, the interrupt request may be of a type that is sent a-periodically and/or in an unpredictable manner. For instance, a request type specific budget value $CCRB_A$ for the periodic and/or predictable interrupt requests may be higher than the request type specific budge value $CCRB_B$ for the interrupt request of a type that is sent a-periodically and/or in an unpredictable manner. Thereby, the risk that the periodic and/or predictably interrupt requests are refused may be reduced since in case the interrupt request is of a type that is sent a-periodically and/or in an unpredictable manner, the amount of processing unit resources used to handle the a-periodic and/or unpredictable request may exhibit a relatively large variation in time, and accordingly the risk of overloading the processing unit 3 may be relatively high. Accordingly, in case the budget value for a-periodic and/or unpredictable requests is set to be relatively low, the risk that the a-periodic and/or unpredictable request is granted and hence the risk that the request causes an unacceptable high amount of use of the processing resources may be reduced.

The comparator 222 may be implemented in any manner suitable for the specific implementation. The comparator 222 may for example include circuitry which can compare the consumption value $RN_i$ with a difference between a budget value and a budget threshold value For example, the comparator 222 may determine whether or not the consumption value $RN_i$ is smaller than a difference between the budget value and a budget threshold value and output the interrupt grant signal when the consumption value is smaller. Initially the budget value may, for instance, be set to a positive value and the threshold may be set to a value lower than the budget value, for example, to zero. In case the threshold is set to zero, the difference between the budget value and the threshold is equivalent to the budget value and hence a comparison between the budget value and the consumption value is similar to a comparison between the difference of the budget value and the threshold and the consumption value. For example, in the interrupt budget memory 21 a budget value may be stored and the comparator 222 may include circuitry arranged to perform a comparison which may be described by the pseudo-code:

if ($RN_i$ < (budget value − threshold))
　then (grant $IR_i$)
　else (deny $IR_i$)

The comparator 222 may also determine, as a predetermined reject criterion, whether the consumption value is larger than a difference between the budget value and a budget threshold value. For instance, initially the budget value may be set to a zero value and the threshold may be set to a positive value higher than zero. For example, the comparator 222 may alternatively include circuitry arranged to perform a comparison which may be described by the pseudo-code:

if ($RN_i$ < (threshold− budget value))
　then (grant $IR_i$)
　else (deny $IR_i$)

When the consumption value $RN_i$ satisfies the grant request criterion, the budget value may for example be adjusted by the data controller 23. As shown in the example of FIG. 2 for instance, the data controller 23 may be connected with a controller input 230 to a comparator output 2222 and with a controller output 231 to an input 211 of the interrupt budget memory 21. The comparator 222 may output a signal to the data controller 23, via the comparator output 2222 and the controller input 230. The data controller 23 may in response to the signal, adjust the budget value stored in the memory 21, via the controller output 231 and the input 211.

The data controller 23 may for example be configured to adjust the budget value such that the difference between the budget value and a budget threshold value is reduced with an amount proportional to the consumption value $RN_i$ when the interrupt grant signal is outputted. For instance, in case the initial budget value is higher than the threshold, the data controller 23 may deduct from the current budget value the amount defined by the consumption value $RN_i$ and store in the memory 21 an update value corresponding to the deducted amount. The data controller 23 may for example include circuitry arranged to perform an operation as may be described by the pseudo-code:

if (grant $IR_i$= true)
　then budget value = budget value −$RN_i$
　else budget value = budget value Alternatively, in case the initial budget value is lower than the budget threshold value, the data controller 23 may add to the current budget value the amount defined by the consumption value $RN_i$ and store in the memory 21 an updated value corresponding to the result of the addition. The data controller 23 may for example include circuitry arranged to perform an operation as may be described by the pseudo-code:

```
if (grant IR_i = true)
    then budget value = budget value +RN_i
    else budget value = budget value
```

Referring to FIG. 3, the interrupt controller 2 may for example include a memory 27 in which a set of at least two consumption values $\{RN_1 \ldots RN_N\}$ are stored (for illustrative purposes in FIG. 3, four consumption values are shown, however it will be apparent that any other suitable number of values may be stored in the consumption value memory 27). Each of the consumption values $RN_1 \ldots RN_N$ may be associated with a specific type i of interrupt requests $IR_i$. As described, the interrupt controller 2 may determine the type of a received interrupt request $IR_i$, for instance from the specific interrupt controller input 200-206 at which the request is received or, for example, from source address information present in the request. The interrupt controller 2 may select from the set a consumption value $RN_i$ associated with the determined type.

The interrupt controller 2 may for example include a selection unit 223 which is connected to the comparator 222 and inputs the selected consumption value $RN_x$ to the comparator 222. As shown in FIG. 3, for instance, the selection unit 223 may be connected with respective inputs 2240-2243 to the memory 27 in which consumption values $RN_1 \ldots RN_4$ associated with interrupt request types $IH_1 \ldots IH_4$ are stored. The selection unit 223 may, as shown, be connected with a selection input 2230 to a interrupt controller input 200. An output 2231 of the selection unit 223 may be connected, e.g. via the budget controller input 220, to the comparator input 2220. As shown in the example of FIG. 3, the selection unit 223 may further be connected to the data controller 23. For instance, the output 2231 of the selection unit 223 may be connected to an input 232 of the data controller 23.

At the selection input 2230 the interrupt request $IR_i$ may be received. The selection unit 223 may for instance determine the type or source of the interrupt request from the interrupt input 200-206 at which the interrupt request is received and select from the memory 27 the consumption value $RN_1 \ldots RN_4$ associated with the respective type or source. At the selection output 2231 the selected consumption value $RN_x$ may be outputted, e.g. to the comparator 222 and the data controller 23. As shown in the example of FIG. 3, the memory 27 may be connectable to devices outside the interrupt controller 2 to set the consumption values $RN_1 \ldots RN_N$. In FIG. 3, for example, the interrupt controller 2 includes value inputs 270-273 via which another device can set the values stored in the consumption value memory 27. For example, the value inputs 270-273 may be connected to the processing unit 3 and the processing unit 3 may store via the inputs 270-273 values in the consumption value memory 27.

The consumption values $RN_1 \ldots RN_N$ may be any suitable value. The consumption values may for instance be based, by for example the processing unit 3, on the requirements of the types of interrupts with respect to the use of resources. For instance, for a type of interrupts A that have to be granted regardless of the available resources, the respective consumption value $RN_A$ may be set to zero, whereas in case a type of interrupt B may occur only a certain number of times P, the consumption value $RN_B$ may be set to the difference between the initial budget value and the threshold divided by the number of times P.

As mentioned, the budget value may for example be set for a specific type of interrupt, from hereon referred to as a type specific budget value $CCRB_i$. In the budget memory 21, a set of type specific budget values $\{CCRB_1, \ldots, CCRB_N\}$ may stored. The comparator 222 may then select from the budget memory 21 the type specific budget value $CCRB_i$ associated with the determined interrupt request type. The comparator 222 may compare the consumption value $RN_i$ with the type specific budget value $CCRB_i$ and grant the interrupt request when the comparison satisfies a predetermined grant criterion. Use of the type specific budget values may enable a more accurate control, by setting the type specific budget values $CCRB_1 \ldots CCRB_N$ to values which take into account the specific requirements for the different types of interrupts.

For example, for one or more types of interrupts which have a higher priority than lower priority interrupts, a larger budget may be allocated than for the type specific budget value for the lower priority interrupts. Thereby, for example, the change that a high priority interrupt request is rejected may be smaller than for low priority interrupts. For instance, the amount of the budget value allocated to a type of interrupts may be set to zero to disable that type of interrupt. Also the type specific budget values $CCRB_A$ for higher priority interrupts A may be set to a higher value than the type specific budget values $CCRB_B$ for lower priority interrupts B.

The interrupt controller 2 may for example include an overall interrupt budget memory wherein an overall budget value can be stored. In FIG. 3, for example, an overall budget value CRB is stored in a location of the budget memory 21. For example, as is explained below in more detail, the type specific budget values $CCRB_1 \ldots CCRB_N$ may be set periodically and an amount corresponding to the set type specific budget value $CCRB_i$ may be deducted from the overall budget value CRB. In such case, the type specific budget values $CCRB_i$ and the consumption values $RN_i$ for high priority interrupt requests may be set to a smaller value than the type specific budget values $CCRB_i$ and the consumption values $RN_i$ for low priority interrupt request. Thereby, the high priority interrupt requests will consume less of the overall budget value CRB and consume the type specific budget value $CCRB_i$ at a lower rate than the lower priority interrupt requests. Accordingly, the chance that a high priority interrupt request is rejected may be smaller than for low priority interrupts. Furthermore, in case e.g. all interrupts have to be disabled, the overall budget value CRB may be set to zero, whereas in case some types have to be disabled, the type specific budget value(s) $CCRB_i$ for those types may be set to zero.

The interrupt controller 2 may include an overall budget controller 25 connected to the overall interrupt budget memory 21. The overall budget controller 25 may set the interrupt budget values based on the overall budget value CRB. The overall budget controller 25 may further adjust the overall budget value CRB based on a cumulative value of the type specific interrupt budget values $CCRB_i$. As shown in the example of FIG. 3, the overall budget controller 25 may for example be connected with an input 250 and an output 251 to the budget memory 21 in order to receive the budget values stored in the memory 21 and to store modified budget values in the memory 21.

For instance, as shown in FIG. 3, the overall budget controller 25 may update type specific budget values $CCRB_i$, for example, periodically, according to a part of the overall budget assigned to the respective type of interrupt requests. The overall budget controller 25 may adjust the overall budget value corresponding to cumulative updates to the type specific budget values $CCRB_i$. The overall budget controller 25 may for example be connected to a timer 29 to determine the period of time which has lapsed after an update. The overall budget controller 25 may for example update a type specific budget value $CCRB_i$ when a type specific period of time $P_i$ has lapsed after updating.

The overall budget controller 25 may for example be connected to the memory 27 to retrieve the amounts of budget assigned to a type of interrupt requests. As shown in FIG. 3, the overall budget controller 25 may for example be connected with an input 254 to an output 274 of the memory 27. For instance, values which represent an assigned budget $RB_i$ associated with to a type of interrupt request $IR_i$ may be stored in the memory 27. The overall budget controller 25 may for instance periodically reset the type specific budget values $CCRB_i$ to the value of the assigned budget $RB_i$.

For instance, the overall budget controller 25 may at initialization perform an operation as may be described by the pseudo-code:

```
for i= 1 to N do
  {
  start timer(i)
  CCRB_i = RB_i
  CRB= CRB- RB_i
  i=i+1
  }
```

After initialization, when the timer(i) for the respective interrupt request type $IR_i$ reached the update time $P_i$, the overall budget controller 25 may for example perform an operation as may be described by the pseudo-code:

```
when time(i)=P_i
  {
    if CRB > RB_i
    then{
          CCRB_i = RB_i
          CRB= CRB- RB_i
          timer(i)=0
        }
    else generate warning activation
  }
```

As mentioned, the overall budget value CRB and/or the type specific budget values $CCRB_i$ may be updated periodically. As explained above, the budget values may for example be reset at points in time spaced by certain time-intervals. However, the budget values may be updated in a semi-continuous manner. For instance, the type specific budget values may be set semi-continuously by a method which may be described as:

$$CCRB_i(t) = CCRB_i(t_0) + \int_{t_0}^{t_1} RB_i(t)dt - \sum RN_i \quad (1)$$

in which $\Sigma RN_i$ represents the added consumption values $RN_i$ of the total number of interrupt requests $IR_i$ granted in the time interval between $t_0$ and $t_1$. The overall budget value may be set semi-continuously by a method which may be described as:

$$CRB(t) = CRB(t_0) + \int_{t_0}^{t_1} A(t)dt - \sum_{i=1}^{i=N} \int_{t_0}^{t_1} RB_i(t)dt \quad (2)$$

in which A(t) represents an update rate of the overall budget, which may be a constant or vary in time.

The interrupt controller 2 may include a signal generator 26 connected to the memory 21. The signal generator 26 may generate a warning signal when a difference between the budget value and a threshold value satisfies a predetermined warning criterion. In the example of FIG. 3, for instance, an input of the signal generator 26 is connected to an output 252 of the overall budget controller 25. The overall budget controller 25 may, for example, output an activation signal to the signal generator 26. In response to the activation signal, the signal generator 26 may output a warning signal at a signal generator output 261. The signal generator output 261 may for example be connected to a warning output 208 of the budget controller 22. The warning output 208 may for instance be connected to the processing unit 3, to inform the processing unit 3 that the overall budget value CRB is too low, and accordingly an error has occurred. In response to receiving the warning signal, the processing unit 3 may, for instance, execute a diagnostic routine to find out where the error has occurred and how the error can be solved.

The overall interrupt budget memory 21 may have a budget update input 207 for periodically receiving data representing a new overall budget value. In the example of FIG. 3, for instance, the budget update input 207 is connectable to a budget update output 32 of the processing unit 3, as indicated with the dashed line in FIG. 3. The processing unit 3 includes, as shown in FIG. 3, a budget controller 33. The budget controller 33 can set the overall budget value CRB via the budget update output 32 and the budget update input 207. Thereby, in case the budget value is not updated, for example, due to a failure in the processing unit 3, the budget value will reach the threshold value and all interrupts will be rejected.

The overall budget value CRB may for example be updated periodically, e.g. reset to it's initial value, to control the amount of resources used per period of time by the interrupt requests. Thereby, the processing unit 3 may be protected from an interrupt overload in case of a failure/-s. As shown in FIG. 3, the budget controller 33 may for example be connected to a timer 34 and update the overall budget value CRB at certain points in time, for example, periodically, e.g. at regular time intervals. Furthermore, in case, for example, the updating of the budget value has been omitted due to a transient failure. and the failure disappears after a certain time, the system may return to its normal operation mode automatically and accordingly stability of the processing unit 3 may be improved.

In the memory 21, also one or more budget warning values may be stored. For instance, warning values for the overall budget CRB may be stored in the memory 21. The warning value may for example indicate that, although the overall budget CRB has not been consumed completely, certain types of interrupt requests $IR_i$ cannot be granted anymore because they will consume the entire remaining budget. For instance, the warning value may be set to the difference between the overall budget threshold value and the assigned budget $RB_i$. The overall budget controller 25 may then output a warning signal in case for a certain type of interrupt requests the assigned budget $RB_i$ is larger than the remaining part of the overall budget CRB and hence the type specific budget $CCRB_i$ for this type of interrupt request cannot be updated anymore. Thereby, for instance, the processing unit 3 may be informed that a certain type of interrupt request will be rejected until the overall budget CRB is updated.

The processing assembly 1 may for example be included in a distributed processing system. The distributed system may include a number of nodes which are connected to the processing assembly. The nodes may, together with the processing unit 3 run simultaneously different parts of a computer program and communicate with each other.

The processing assembly 1 may for example be included in, for example, in a stationary system or a vehicle, such as a car or a plane or other type of vehicle. For instance, FIG. 4 shows an example of vehicle 300 in which a processing assembly 1 is provided. The example shown in FIG. 4 includes an engine 302. An engine control node 313 may be present which can control and monitor the engine 302. The vehicle may further have break control nodes 314 which can control and monitor the breaks 301. The vehicle 300 may also have door lock control nodes 312 which can actuate the locking and unlocking of doors 303 of the vehicle 300. The nodes 312-314 may be connected to a display node 311 via a connection 315. At the display 311, for example, data can be outputted in a for humans perceptible form, for example, informing an occupant of the vehicle whether or not the doors 303 are locked and or the rotations per minute (rpm) the engine is running. The nodes 311-314 may, as shown in FIG. 4, be connected to the processing unit 3 and may transmit interrupt requests to the processing unit 3, for example, to receive node control data or to transmit sensor data to the processing unit. The interrupt requests may subsequently be granted or rejected by the interrupt controller 2, as has been explained above in more detail. Since the interrupt controller 2 is present, an overload of the processing unit 3 by the interrupt requests can be prevented and accordingly the safety of the vehicle may be improved.

The invention may be implemented as a kit of parts. The kit may be provided as a set of separate components which can be connected to each other to assemble, for example, an interrupt controller.

The invention may also be implemented in a computer program for running on a computer system, at least including code portions for performing steps of a method according to the invention when run on a programmable apparatus, such as a computer system or enabling a programmable apparatus to perform functions of a device or system according to the invention. Such a computer program may be provided on a machine-readable medium. The computer program may for example be able to reconfigure a configurable piece of hardware such that the piece of hardware can perform functions of a device or system according to the invention. For instance, the computer program may be able to program a Programmable Read only memory (PROM).

The invention may also be implemented as data representing an integrated circuit or other hardware, for example, as a set of data defining one or more masks suitable for a lithographic process. The data may represent the hardware in any suitable manner and for example represent the date using a hardware description language or another functional description language. Additionally, the data may represent a circuit level model with logic and/or transistor gates. Furthermore, the data may represent a physical placement of various devices in a hardware model. The data may represent a hardware model, such as the data specifying the presence or absence of various features on different mask layers for masks used to produce the integrated circuit. The data may be stored in any form of a machine-readable medium. Also, the data may include configuration data for a field programmable gate array (FPGA) or a complex programmable logic device (CPLD) or other configurable hardware device.

The machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, (e.g., carrier waves, infrared signals, digital signals, etc.) or the like. The machine-readable medium may further include a data connection, such as a telephone cable or a wireless connection and/or a transmission over the Internet, electrical, optical, acoustical or other forms of propagated signals. However, the invention may also be implemented partially in specific hardware components that contain hardwired logic, or by a combination of programmed computer components and custom hardware components.

In the foregoing specification, the invention has been described with reference to specific examples of embodiments of the invention. It will, however, be evident that various modifications and changes may be made therein without departing from the broader spirit and scope of the invention as set forth in the appended claims. For example, in FIG. 2, for illustrative purpose, only one interrupt budget memory 21, one budget controller 22, and one data controller 23 are shown and the interrupt controller inputs 200-206 are connected to the same budget controller 22. However, the interrupt controller 2 may include two or more interrupt budget memories 21 and/or, two or more budget controllers 22 and/or two or more memory controllers 23. For instance, each interrupt controller may be connected to a separate budget controller 22 with a separate interrupt budget memory 21 and a separate data controller 23.

Furthermore, the request controller may control two or more different types of resources of the processing unit simultaneously. The resource budges memory may, in such case, for example, include a number of vectors $V_i$, the elements of which representing the budget values $CCRB_i$ available to a request type $IR_i$ for the different types of resources.

Also, the interrupt controller 2 may include a request priority processor which determines a priority of an interrupt request and grant the interrupt request or schedule the handling thereof based on the determined priority.

Also, the processing unit 3 may for example include a microcontroller. The processing unit 3 may for example include one or more of: a DSP controller, a sequencer, a computer, a distributed computer system, another interrupt controller. Also, the processing unit 3 and/or the interrupt controller 2 may form part of a System on a chip (SoC). The processing unit 3 may also be a microprocessor and for example include a central processing unit (CPU) and/or a coprocessor and/or a digital signal processor and/or an embedded processor. The processing unit 3 may also include a microcontroller (µC).

Furthermore, the processing unit 3 may be used in any suitable type of application and for example be implemented in a robot, a machine, an vehicle for transportation of good or persons such as a vessel, an airplane, or a wheeled vehicle (for example a car or other automobile). The processing unit 3 may for instance be a part of a (tele)communication device, such as a mobile phone, or be used in any other suitable type of apparatus.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. For example, the interrupt controller 2 may be implemented as a number of separate, discrete devices connected to each other to form the interrupt controller. Also, for example, the memories 21, 27 may be implemented on separate devices to which e.g. a comparator and other components of the interrupt controller 2 are connected.

Also, devices functionally forming separate devices may be integrated in a single physical device. For example, the processing arrangement 1 may be implemented as a single integrated circuit.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the words 'a' and 'an' shall not be construed as limited to 'only one', but instead are used to mean 'at least one', and do not exclude a plurality. Also, the term 'memory' includes any medium suitable to store information, such as for instance a register, random access memory (RAM), cache memory or any other medium suitable to store information The mere fact that certain measures are recited in mutually different claims does not indicate that a combination of these measures cannot be used to advantage.

The invention claimed is:

1. A request controller for controlling processing of requests by at least one semiconductor data processing unit, said resource controller comprising:
    a controller input for receiving a request for said processing unit to switch a context of said processing unit or to switch said processing unit from a current operation to another operation;
    a resource budget memory in which at least one budget value can be stored, said budget value representing a resource amount of a resource of said processing unit;
    a budget controller including:
        a first budget controller input connected to said request controller input;
        a second budget controller input connected to said memory;
        a comparator connected to said first budget controller input and said second controller input, for comparing a consumption value associated with said request with said budget value, which comparator includes a comparator output for outputting a request grant signal when said comparison satisfies a predetermined grant criterion and outputting a request reject value when said comparison meets a predetermined reject criterion;
        a data controller connected to said resource budget memory and said comparator output, for adjusting said budget value when said request grant signal is outputted.

2. A request controller as claimed in claim 1, wherein said predetermined grant criterion includes:
    determining whether said consumption value is smaller than a difference between said budget value and a budget threshold value;

and wherein said predetermined reject criterion includes:
    determining whether said consumption value is larger than a difference between said budget value and a budget threshold value, and
wherein said data controller is configured to adjust said budget value such that said difference between said budget value and a budget threshold value is reduced with an amount proportional to said consumption value when said request grant signal is outputted.

3. A request controller as claimed in claim 1, wherein
a set of at least two request budget values each associated with a type of request can be stored in said memory and wherein said request controller includes:
    a selection unit connected to said resource budget memory and said request controller input, for determining a type of the request received at said request controller input and selecting from said set a budget value associated with the determined type, which selection unit is connected to said budget controller for inputting said selected budget value to said budget controller as said budget value.

4. A request controller as claimed in claim 3, including:
an overall budget memory wherein an overall budget value can be stored;
an overall budget controller connected to said overall interrupt budget memory for setting said request budget values based on the overall budget value, and optionally adjusting said overall budget value based on a cumulative amount of the set request budget values.

5. A request controller as claimed in claim 4, wherein said overall budget memory has a budget update input for receiving data representing a new overall budget value.

6. A request controller as claimed in claim 1, including a signal generator connected to said memory, for generating a warning signal when a difference between said budget value and a threshold value satisfies a predetermined warning criterion.

7. A request controller as claimed in claim 1, wherein said budget threshold value is lower than said current budget value and wherein said data controller is arranged to deduct said consumption value from said current budget value when said request grant signal is outputted.

8. A request controller as claimed in claim 1, wherein at least one of said at least one budget value represents a current amount of available budget and wherein said data controller is arranged to reduce said budget value with an amount proportional to said consumption value when said interrupt grant signal is outputted.

9. A request controller as claimed in claim 1, wherein at least one of said at least one budget value represents a cumulative amount of used resources and wherein said data controller is arranged to increase said budget value with an amount proportional to said consumption value when said request grant signal is outputted.

10. A request controller as claimed in claim 1, wherein said memory includes a value control input for adjusting said budget value such that said difference between said budget value and a budget threshold value is increased.

11. A request controller as claimed in claim 1, wherein said request includes one or more of the group consisting of: interrupt request, context switch request, task switch request, thread switch request, process switch request.

12. A processing unit, including a request controller as claimed in claim 1.

13. A method for controlling processing of requests by at least one semiconductor data processing unit, comprising:

receiving at a controller input a request for said processing unit to switch a context of said processing unit or to switch said processing unit from a current an operation to another operation;

storing a budget value in a resource budget memory, said budget value representing a resource amount of a resource of said processing unit;

comparing at a comparator a consumption value associated with said request with the budget value stored in the resource budget memory;

outputting at a comparator output a request grant signal when said comparison satisfies a predetermined grant criterion;

outputting at the comparator output a request reject value when said comparison meets a predetermined reject criterion; and adjusting at a data controller connected to the resource budget memory and the comparator output said budget value when said request grant signal is outputted.

14. A request controller as claimed in claim 2, wherein:

a set of at least two request budget values each associated with a type of request can be stored in said memory and wherein said request controller includes:

a selection unit connected to said resource budget memory and said request control input, for determining a type of the request received at said request controller input and selecting from said set a budget value associated with the determined type, which selection unit is connected to said budget controller for inputting said selected budget value to said budget controller as said budget value.

15. A request controller as claimed in claim 2, including a signal generator connected to said memory, for generating a warning signal when a difference between said budget value and a threshold value satisfies a predetermined warning criterion.

16. A request controller as claimed in claim 3, including a signal generator connected to said memory, for generating a warning signal when a difference between said budget value and a threshold value satisfies a predetermined warning criterion.

17. A request controller as claimed in claim 3, wherein said budget threshold value is lower than said current budget value and wherein said data controller is arranged to deduct said consumption value from said current budget value when said request grant signal is outputted.

18. A request controller as claimed in claim 2, wherein at least one of said at least one budget value represents a current amount of available budget and wherein said data controller is arranged to reduce said budget value with an amount proportional to said consumption value when said interrupt grant signal is outputted.

19. A request controller as claimed in claim 2, wherein at least one of said at least one budget value represents a cumulative amount of used resources and wherein said data controller is arranged to increase said budget value with an amount proportional to said consumption value when said request grant signal is outputted.

20. A request controller as claimed in claim 3, wherein said memory includes a value control input for adjusting said budget value such that said difference between said budget value and a budget threshold value is increased.

* * * * *